United States Patent
Li et al.

(10) Patent No.: US 12,492,509 B2
(45) Date of Patent: Dec. 9, 2025

(54) GRAVITY-DRIVEN CHITOSAN-ENHANCED MELAMINE SPONGE FOR STABLE ULTRAFAST FILTRATION

(71) Applicant: VERSITECH LIMITED, Hong Kong (HK)

(72) Inventors: Xiaoyan Li, Hong Kong (HK); Haibo Li, Hong Kong (HK)

(73) Assignee: VERSITECH LIMITED, Hong Kong (HK)

( * ) Notice: Subject to any disclaimer, the term of this patent is extended or adjusted under 35 U.S.C. 154(b) by 0 days.

(21) Appl. No.: 17/259,568

(22) PCT Filed: Sep. 16, 2019

(86) PCT No.: PCT/CN2019/105893
§ 371 (c)(1),
(2) Date: Jan. 12, 2021

(87) PCT Pub. No.: WO2020/052679
PCT Pub. Date: Mar. 19, 2020

(65) Prior Publication Data
US 2021/0268447 A1    Sep. 2, 2021

Related U.S. Application Data

(60) Provisional application No. 62/731,142, filed on Sep. 14, 2018.

(51) Int. Cl.
*B01D 65/02* (2006.01)
*B01D 69/02* (2006.01)
(Continued)

(52) U.S. Cl.
CPC .......... *D06N 7/0002* (2013.01); *B01D 65/02* (2013.01); *B01D 69/02* (2013.01); *B01D 71/08* (2013.01);
(Continued)

(58) Field of Classification Search
None
See application file for complete search history.

(56) References Cited

U.S. PATENT DOCUMENTS

| | | | |
|---|---|---|---|
| 8,975,387 B1 * | 3/2015 | Venditti | C08B 31/12 536/102 |
| 2013/0199993 A1 * | 8/2013 | Wong | B01D 39/1676 210/500.1 |

(Continued)

FOREIGN PATENT DOCUMENTS

| | | | |
|---|---|---|---|
| CN | 105771909 A | * | 7/2016 |
| CN | 105771923 A | * | 7/2016 |

(Continued)

OTHER PUBLICATIONS

Yuan, et. al, Successive grafting of poly(hydroxyethyl methacrylate) brushes and melamine onto chitosan microspheres for effective Cu(II) uptake, 2017, International Journal of Biological Macromolecules, 109, p. 287-302 (Year: 2017).*

(Continued)

*Primary Examiner* — Bradley R Spies
*Assistant Examiner* — Jeannie Mcdermott
(74) *Attorney, Agent, or Firm* — Amin, Turocy & Watson, LLP (57) ABSTRACT

Devices and methods related to a chitosan-enhanced melamine sponge are provided. A method comprises grafting chitosan on the melamine sponge matrix via the chemical with two or more carboxyl groups; and crosslinking the chitosan with crosslinker under a heating procedure to make a more robust melamine sponge with a larger surface and smaller pores. The chitosan-enhanced melamine sponge is used to separate chemicals from water as a gravity flow-driven filter, and it can be compressed and backwashed for regeneration.

18 Claims, 11 Drawing Sheets

The schematic diagram of the enhancement process of commercial melamine sponge by chitosan.

(51) Int. Cl.

| | | |
|---|---|---|
| *B01D 71/08* | (2006.01) | |
| *B01J 20/28* | (2006.01) | |
| *B01J 20/32* | (2006.01) | |
| *B01J 20/34* | (2006.01) | |
| *B32B 25/04* | (2006.01) | |
| *B32B 25/06* | (2006.01) | |
| *B32B 25/10* | (2006.01) | |
| *B32B 25/20* | (2006.01) | |
| *B32B 37/10* | (2006.01) | |
| *B32B 38/06* | (2006.01) | |
| *C02F 1/28* | (2023.01) | |
| *C08J 9/42* | (2006.01) | |
| *D06N 7/00* | (2006.01) | |
| *C02F 1/44* | (2023.01) | |
| *C02F 101/30* | (2006.01) | |

(52) U.S. Cl.
CPC ... *B01J 20/28045* (2013.01); *B01J 20/28085* (2013.01); *B01J 20/3274* (2013.01); *B01J 20/3278* (2013.01); *B01J 20/3282* (2013.01); *B01J 20/3425* (2013.01); *B01J 20/3475* (2013.01); *B32B 25/04* (2013.01); *B32B 25/06* (2013.01); *B32B 25/10* (2013.01); *B32B 25/20* (2013.01); *B32B 37/10* (2013.01); *B32B 38/06* (2013.01); *C08J 9/42* (2013.01); *B01D 2321/04* (2013.01); *B01D 2323/30* (2013.01); *B01D 2325/026* (2013.01); *C02F 1/288* (2013.01); *C02F 1/444* (2013.01); *C02F 2101/308* (2013.01); *C02F 2303/16* (2013.01); *C08J 2405/08* (2013.01); *D06N 2203/066* (2013.01); *D06N 2209/043* (2013.01); *D06N 2209/067* (2013.01); *D06N 2209/142* (2013.01); *D06N 2209/1692* (2013.01); *D06N 2211/063* (2013.01)

(56) References Cited

U.S. PATENT DOCUMENTS

2016/0168347 A1\* 6/2016 Cheung .................. C07K 17/04
530/331
2017/0002098 A1\* 1/2017 Ayoub .................... A61L 15/28

FOREIGN PATENT DOCUMENTS

| CN | 105771924 A | \* | 7/2016 |
| CN | 105771925 A | \* | 7/2016 |

OTHER PUBLICATIONS

International Search Report and Written Opinion for International Application No. PCT/CN2019/105893 mailed on Dec. 12, 2019, 5 pages.

\* cited by examiner

Figure 1. The schematic diagram of the enhancement process of commercial melamine sponge by chitosan.

Figure 2. SEM images of the commercial melamine sponges before and after the enhancement of chitosan. A: Raw sponge, 200X; B: Chitosan-enhanced sponge, 200X; C: Chitosan-enhanced sponge, 1000X.

Figure 3. Fourier-transform infrared spectroscopy (FTIR) spectra of the commercial melamine sponges before and after the enhancement of chitosan.

Figure 4. Filtration performance of chitosan-enhanced melamine sponge for removal of acidic mordant black and Evans blue (sponge thickness of 4cm, compression ratio of 0, filtration velocity of 0.4 m/h, dye concentration of 20 mg/L).

Figure 5. Backwashing efficiency of the chitosan-enhanced melamine sponge for removal of acidic mordant black (sponge thickness of 4cm, compression ratio of 0, filtration velocity of 0.4 m/h, dye concentration of 20 mg/L, backwashing procedure: squeezing then backwashing with the first 2-min filtration effluent).

Figure 6. Filtration stability of the chitosan-enhanced melamine sponge after simulative one-year use at different filtration velocity conditions for removal of acidic mordant black (sponge thickness of 4cm, compression ratio of 0, dye concentration of 20 mg/L, backwashing procedure: squeezing and then backwashing with the first 2-min filtration effluent).

Figure 7. Potential filtration velocity of the CEMSs at different compression ratio (CR) for 99% removal of the chemicals with different molecular weight (MW). Tc = Tr (1-CR), here, Tc is the thickness of compressed sponge, and Tr is the thickness of raw sponge without compression.

Figure 8. Diagram of sponge structure (vertical view) in the modification process including grafting chitosan and crosslinking chitosan.

Figure 9. The sponges with a high content of chitosan (Left: bottom of water) and suitable content of chitosan (Right: top of water) in water.

Figure 10. Temperature changes of sponge and water bath with an increase of heating time in the reaction process of sponge with chitosan (two endothermic phases under 85 °C: Phase A and Phase B).

Figure 11. Behavior diagram of the cascading filtration over sponge (A) and layer-by-layer filtration over traditional membranes (B).

GRAVITY-DRIVEN CHITOSAN-ENHANCED MELAMINE SPONGE FOR STABLE ULTRAFAST FILTRATION

TECHNICAL FIELD

This disclosure relates to a melamine sponge-based membrane, methods of manufacturing the membrane, and methods of using the membrane, such as in water treatment and purification.

BACKGROUND

Membrane-based separation is an important technology for water treatment, but it suffers from the problem of high energy consumption, especially with the membrane fouling. Fabricating energy-saving membranes is a possible avenue to innovate the water treatment market.

Commercial melamine sponges generally have a large water flux, but they are incapable of capturing chemicals less than 100 nm in size because of its fibrous matrix with micrometer-size pores. To improve the capture ability, decreasing the pore size of the melamine sponge is a potential way, considering the filtration mechanism of geometric size exclusion. However, at the same time, the water flux is also reduced significantly, resulting in burdensomely high energy consumption for filtration. How to obtain a sponge membrane with both high capture ability and large water flux under a low energy input is challenging in the water filtration industry.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

In another embodiment, a chitosan-enhanced melamine sponge membrane includes crosslinked chitosan groups grafted on a melamine sponge matrix, the chitosan-enhanced melamine sponge having a larger surface and smaller pores than the melamine sponge matrix.

In an embodiment, a method of manufacturing a chitosan-enhanced melamine sponge-based membrane involves: (1) grafting chitosan on the sponge matrix via the chemicals with two or more carboxyl groups; and (2) crosslinking the chitosan with glutaraldehyde under a heating procedure to make a new robust melamine sponge with a larger surface and smaller pores.

In another embodiment, a method of separating chemicals from a fluid stream by using a chitosan-enhanced melamine sponge-based membrane involves: (1) providing a filter comprising the chitosan-enhanced melamine sponge membrane; and (2) driving the fluid stream to pass through the filter for filtration by gravity to reduce the energy input.

In another embodiment, a method of separating chemicals from a fluid stream by using a chitosan-enhanced melamine sponge-based membrane involves: (1) adjusting the compression ratio of the membrane to separate different chemicals from a fluid stream during a gravity-driven purification process; and (2) squeezing and then backwashing the membrane in order to preserve its serviceable lifespan.

DETAILED DISCLOSURE

The following disclosure and exemplary embodiments are presented to enable one of ordinary skill in the art to make and use a chitosan-enhanced porous melamine sponge with large surface according to the subject invention. Various modifications to the embodiments will be readily apparent to those skilled in the art and the generic principles herein may be applied to other embodiments. Thus, the devices and methods related to the chitosan-enhanced porous melamine sponge with large surface are not intended to be limited to the embodiments shown, but are to be accorded the widest scope consistent with the principles and features described herein.

Melamine sponge with the long chain of chitosan that has many hydroxyl groups and amine groups can be fabricated with the grafting by using the grafting agent of the chemical with two or more carboxylic groups. In this context, many means more than untreated melamine, such as 1.5 times as many hydroxyl groups and/or amine groups or at least twice as many hydroxyl groups and/or amine groups than untreated melamine. Then, a more robust melamine sponge with a larger surface and smaller pores can be produced by crosslinking the chitosan chains, finally named chitosan-enhanced melamine sponge (CEMS). The CEMSs compressed at different levels can be fixed to form filters/membranes with different filtration efficiency and velocity under gravity flow for microfiltration, ultrafiltration, nanofiltration, and biofiltration in the process of water treatment and purification.

The term "filter" or "membrane" as used herein refers to a selectively permeable material that selectively allows certain species to pass through it while retaining others within or on the material. The manner or mechanism of retention is determined by the structure of membrane. Membrane operation can be based on geometrical size exclusion and use pores as gates to reject an unwanted species having a larger size than the membrane's gate size. Membrane operation can also be based on frictional resistance and use the channel surface to capture specific species through physical friction and/or chemical reactions.

As used, the term "chitosan-enhanced melamine sponge filter" refers to a filter or a membrane comprising or formed of melamine sponge, a material based on melamine sponge, or a melamine sponge composite. The materials based on melamine sponge refer to the derivatives of melamine, but modified chemically, and having the hydrophilic and compressible properties. The melamine composite refers to a composite formed of melamine, polymers, and/or particles adsorbed on the surface of the melamine. Examples of the polymers include, but are not limited to, poly(3-hydroxybutyrate-co-3-hydroxyvalerate), poly(DL-lactic-co-glycolic acid), poly(N-vinyl lactam), poly(methylenephenylene isocyanate), mixtures thereof, and copolymers thereof. Examples of the particles include graphene oxide, graphite, carbon nanotubes, and/or titanium dioxide particles or other particles having absorbtive properties.

In various embodiments, the melamine sponge with the long chain of chitosan (named acidic melamine sponge here) that has many hydroxyl groups and amine groups can be fabricated with the grafting by using the grafting agent of the chemical with two or more carboxylic groups. The chemical with two or more carboxylic groups can be polycarboxylic acid, salts thereof, and the like. Examples include oxalic acid, acrylic acid, hexanedioic acid, phthalic acid, butenedioic acid, citric acid or pyromellitic acid.

The adding manners of the above acidic chemical include pre-reaction with melamine matrix and one-step reaction with both melamine and chitosan. In the pre-reaction operation, the raw melamine sponge first soaks up and react with the solution of the acidic chemical, and then is dried to further soak up and react with chitosan. In the one-step reaction operation, the raw melamine sponge is soaked into the mixture solution of the acidic chemical and chitosan to directly react with both. For efficient grafting, compressing the sponge under the conditions of heating and ultrasonic degassing can be used in the operation process of the two adding manners. The adding mass ratio of the acidic chemical to the raw dry melamine sponge is from 2 to 8, at the same time, the mass ratio of chitosan to the raw dry melamine sponge is from 0.8 to 2.5. In another embodiment, the adding mass ratio of the acidic chemical to the raw dry melamine sponge is from 3 to 7, at the same time, the mass ratio of chitosan to the raw dry melamine sponge is from 1 to 2. The temperature of the acidic chemical solution or the mixture solution is controlled from 38° C. to 65° C. In another embodiment, the temperature of the acidic chemical solution or the mixture solution is controlled from 45° C. to 60° C. The compression frequency of the melamine sponge must be less than 6 times per minute, and its compression ratio in the soaking process must be less than 80%. In another embodiment, the compression frequency of the melamine sponge must be less than 5 times per minute, and its compression ratio in the soaking process must be less than 70%. In some embodiments, the ultrasonic condition after the grafting reaction may continue to age the acidic melamine sponge before drying.

In various embodiments, a more robust melamine sponge with a larger surface and smaller pores, the chitosan-enhanced melamine sponge (CEMS), can be produced by crosslinking the chitosan chains on the acidic melamine sponge via a crosslinker. The crosslinker can be one of dialdehyde chemicals (such as glutaraldehyde and terephthalaldehyde), one of polyphosphate chemicals (such as sodium tripolyphosphate and sodium hexametaphosphate), or carrageenan. For efficient crosslinking, soaking and compressing the sponge under the conditions of heating and ultrasonic degassing can be used. The mass ratio of glutaraldehyde to the raw dry melamine sponge is from 0.9 to 3.6. The temperature of the crosslinker solution is controlled over 85° C., but under 200° C. In another embodiment, the temperature of the crosslinker solution is controlled over 90° C. and under 180° C. The compression frequency of the melamine sponge must be less than 2 times per minute, and its compression ratio in the soaking process must be less than 50%. In some embodiments, the heating may continue until the complete evaporation of water.

The chitosan-enhanced melamine sponge can be compressed or squeezed by a device to form a filter. The compression ratio can be adjusted from 0 to 4/5 to reject different size of chemicals under different filtration velocity. In some embodiments, the device used for compressing the sponge should be elastic with rapid compression velocity to produce a large water shear to desorb the chemicals from the sponge. The filter of chitosan-enhanced melamine sponge can be driven by the gravity flow for filtration to reduce the energy input.

In various embodiments, the backwashing of the sponge can be carried out by following a procedure of squeezing, soaking in a regenerant solution, and then squeezing. The procedure can be repeated. The regenerant solution may be pure water, the clean filtration influent, a surfactant solution, or an acid solution.

In various embodiments, the shape of the sponge depends on the thickness of the membrane after compressing and the shape of the supporting substrate. Therefore, the chitosan-enhanced melamine sponge may, for example, be a flat-sheet membrane or a spiral wound membrane.

In various embodiments, the chitosan-enhanced melamine sponge is configured to reject chemicals and particles with the size from 1 nm to 900 µm. In other embodiments, the chitosan-enhanced melamine sponge is configured to reject chemicals and particles with the size from 5 nm to 800 µm. In other embodiments, the chitosan-enhanced melamine sponge is configured to reject chemicals and particles with the size from 10 nm to 750 µm. Examples of chemicals and particles rejected by the chitosan-enhanced melamine sponge include dye, bacteria, and microplastic. The sponge may directly be applied as a microfiltration membrane, an ultrafiltration membrane, a nanofiltration membrane, and a biofiltration membrane for use in various applications such as water treatment, purification, and pharmaceutical and chemical separation.

For example, a chitosan-enhanced melamine sponge can increase the rejection rate of dyes without reducing the water flux. Also, the sponges are suitable for the selective separation of ions from organics in a fluid stream. As further examples, the sponges are suitable for use in ultrafiltration to remove chemicals with a molecular weight larger than 10,000 g/mol or particles larger than 10 nm while retaining an ultrafast filtration velocity. The membranes can capture microorganisms and are suitable for biofiltration to biologically degrade chemicals in water.

A backwashing procedure can be used to prolong the serviceable lifespan of the chitosan-enhanced melamine sponge. In various embodiments, after squeezing out the residual fluid, the chitosan-enhanced melamine sponge may be backwashed to maintain filtration performance by using clean water with or without a regenerant. A small amount of the filtered effluent is also suitable for backwashing the sponge. A regenerant may, for example, be HCl, acetic acid, ethylene diamine tetraacetic acid (EDTA), Triton-X or ethanol. The concentration of the regenerant, generally, is low, ranging from 0.01% to 2% (v/v). The backwashing velocity and the squeezing velocity, in various embodiments, can be a larger than the filtration velocity. For example, when the filtration pressure is 0.5 m/h, the backwashing pressure may be 1.2 m/h.

In an embodiment, a chitosan-enhanced melamine sponge is configured to reject organics and inorganics having a hydrated radius of at least 1.5 nm.

In an embodiment, a chitosan-enhanced melamine sponge can achieve a porous structure with an average pore size of 10 µm to 30 µm, such as 20 µm and a thickness of 2 cm to 10 cm, such as 6.5 cm. Assuming a uniform energy input, this sponge demonstrates a 3 times larger permeability and can remove 38% more Evans blue dye than a traditional ultrafiltration membrane.

A greater understanding of the technology described herein and of its many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

As further examples, the chitosan-enhanced melamine sponges disclosed herein are suitable for the selective separation of organics and particles, based on the size, the hydraulics, the charge property, and/or the hydrophilicity.

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

Example 1-A: Fabrication of Chitosan-Enhanced Melamine Sponge

Figure 1:
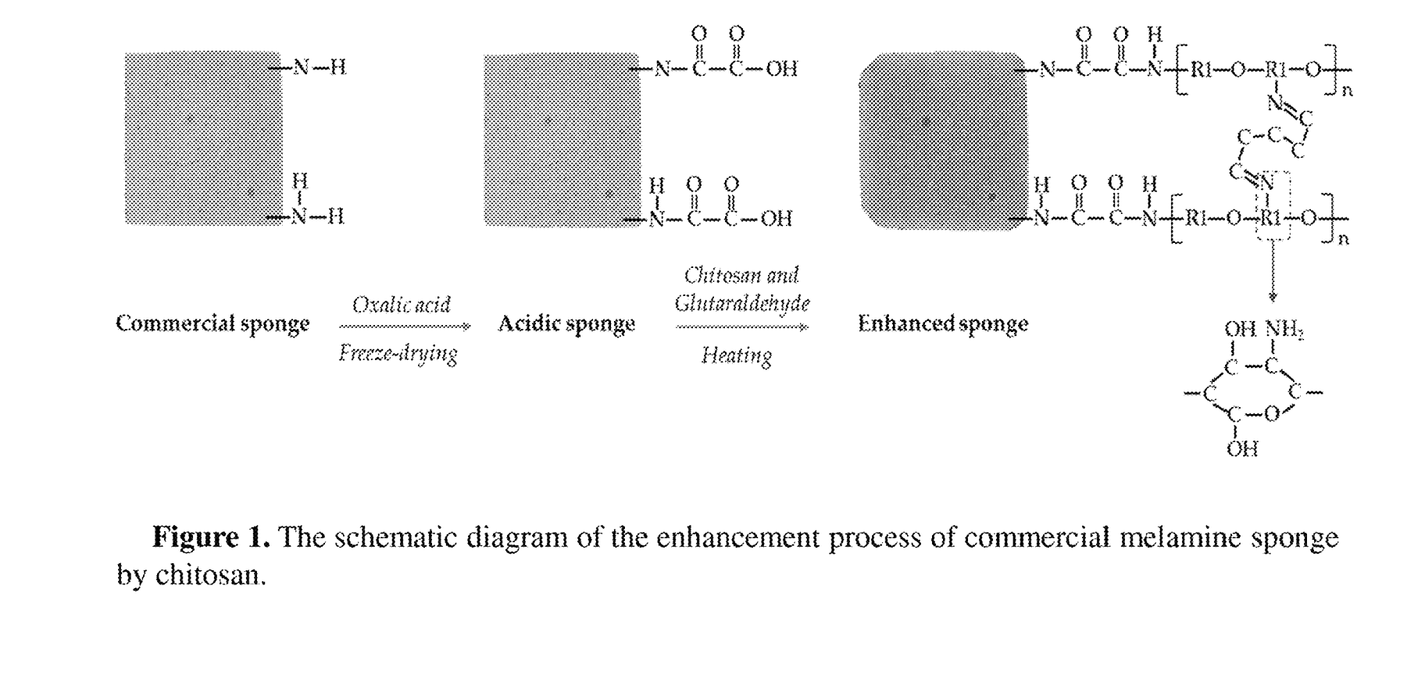
FIG. 1 is a schematic diagram of the enhancement process of commercial melamine sponge by chitosan.

A commercial melamine sponge with pore size of 200 µm was soaked in a solution of oxalic acid. In here, the volume of oxalic acid solution was three times of the dry sponge volume, and the adding mass ratio of the oxalic acid to the raw dry melamine sponge was 7.6. Then, the sponge was compressed for 8 times (with the compression frequency of 10 times per hour) in the acid solution keeping at 60° C. to make the sponge saturated. In the compressing process, the compression ratio of sponge for the saturation adsorbing the oxalic acid was controlled at 60%. After the 30-min ultrasonic degas, the saturated sponge with oxalic acid was freezing-dried. This freezing-dried sponge was further soaked and compressed in a 3% (m/m) chitosan solution for saturation. In here, the mass ratio of chitosan to the raw dry melamine sponge was 2.2, and the temperature of the chitosan solution is controlled at 55° C. Similarly, for saturation, the freezing-dried sponge was compressed for 8 times (with the compression frequency of 10 times per hour) in the chitosan solution, and the compression ratio each time was controlled at 60%. Again, after the 30-min ultrasonic degas, the saturated sponge with chitosan was freezing-dried. Finally, this freezing-dried sponge with chitosan was soaked and saturated in a solution of 0.9% (m/m) glutaraldehyde at 95° C. for one hour with 20 times compression. In this process, the compression ratio of sponge for the saturation was controlled at 40%. Wash the chitosan-enhanced melamine sponge with water for further use. The schematic diagram of the above modification process is shown in FIG. 1.

Example 1-B: Packaging of Chitosan-Enhanced Melamine Sponge

The chitosan-enhanced melamine sponge with thickness of 4 cm was sealed on both sides by the screen mesh with 300 µm-size pores. Then, the sealed sponge was disposed on a hollow platform with a discharge tube, and it could adsorb the influent through its middle as a gravity flow-driven filter. In here, the influent velocity could be adjusted by controlling the tube value of gravity flow. In addition, the stamping device allowing the influent could compress the sponge as a fixator in the filtration process, and could compress and stretch the sponge for producing the water shear flow to backwash the sponge.

Example 1-C: Characterizations of Chitosan-Enhanced Melamine Sponge

Figure 2:
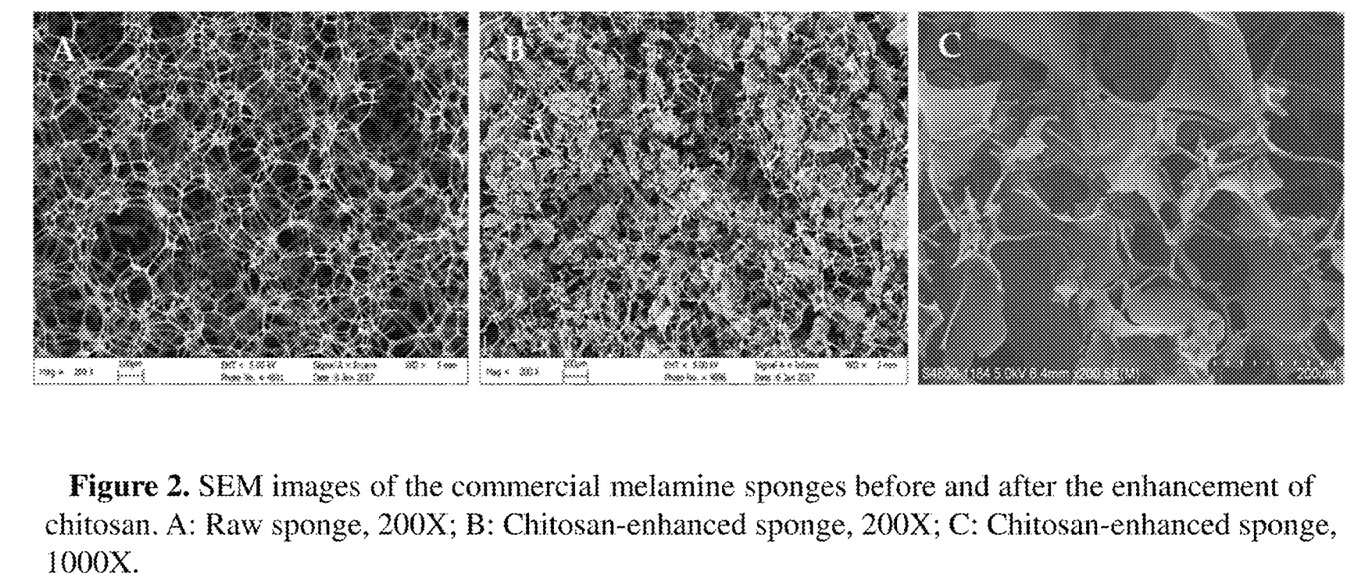
FIG. 2 shows SEM images of the commercial melamine sponges before and after the enhancement of chitosan. A: Raw sponge, 200X; B: Chitosan-enhanced sponge, 200X; C: Chitosan-enhanced sponge, 1000X.
Figure 3:
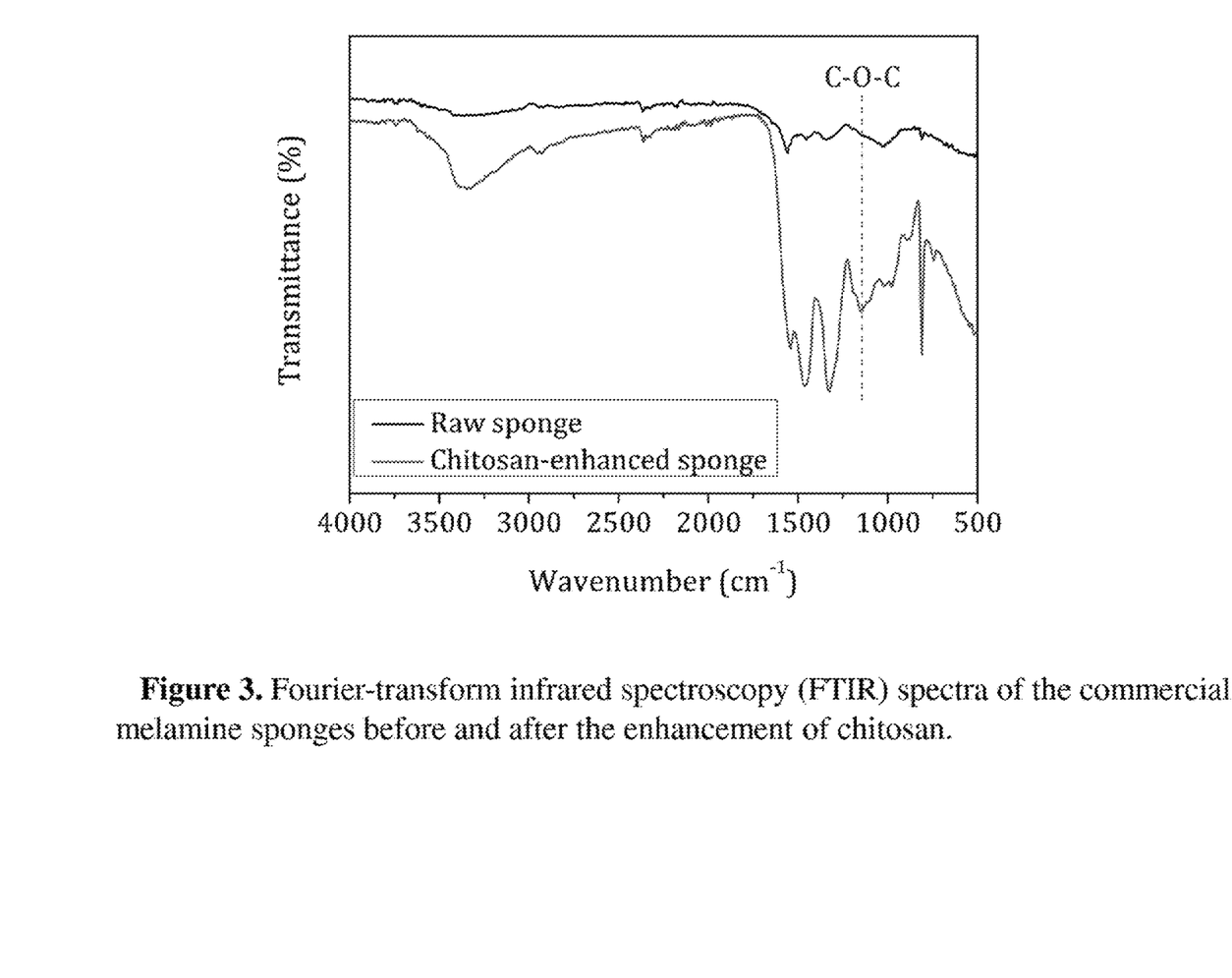
FIG. 3 is a plot of the Fourier-transform infrared spectroscopy (FTIR) spectra of the commercial melamine sponges before and after the enhancement of chitosan.

Physiochemical properties of the chitosan-enhanced melamine sponge were investigated by using SEM and FTIR techniques. FIG. 2 show SEM images of the commercial melamine sponges before and after the enhancement of chitosan. After the modification, the pore size of the commercial melamine sponge decreased to 60 µm from 200 µm because the sponge matrix was enhanced by the chitosan network. Obviously, the sponge surface was significantly improved. Based on the FTIR spectra in FIG. 3, after the enhancement of chitosan, the sponge matrix has a clear peak of C—O—C from the pyran ring of chitosan.

Example 1-D: Experimental Results on Dye Removal

Figure 4:
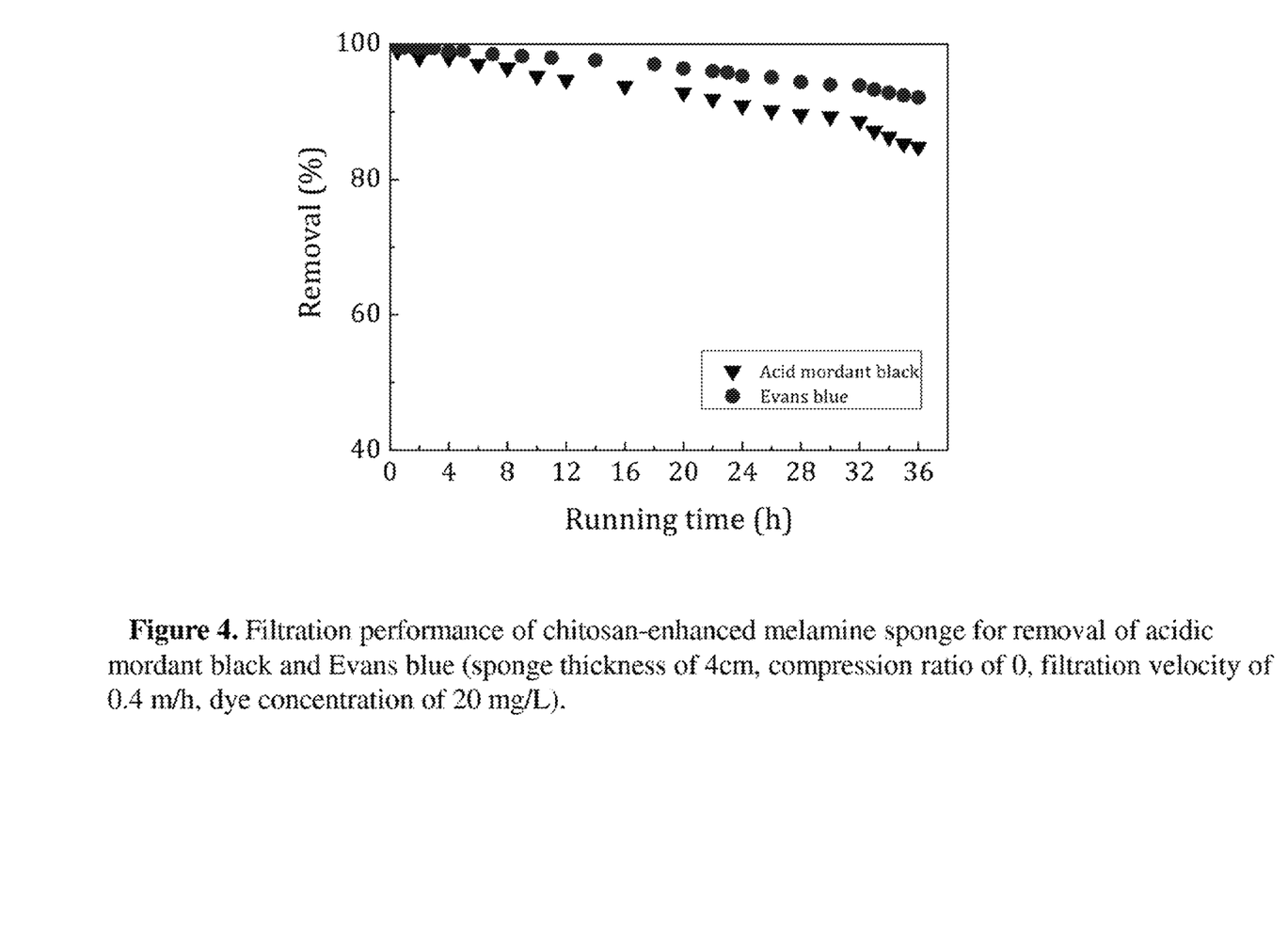
FIG. 4 shows the filtration performance of chitosan-enhanced melamine sponge for removal of acidic mordant black and Evans blue (sponge thickness of 4 cm, compression ratio of 0, filtration velocity of 0.4 m/h, dye concentration of 20 mg/L).

The chitosan-enhanced melamine sponge (named CEMS) showed the obvious increase in the filtration efficiency. At the filtration velocity of 0.4 m/h, the CEMS compressed to 63% of raw height could remove 94% of Evans blue (molecular weight of 961, concentration of 100 mg/L) and 89% of acid mordant black A (molecular weight of 461, concentration of 100 mg/L) after 24-hour running (FIG. 4), presenting 3 times higher removal than the raw commercial melamine sponge.

Example 1-E: Experimental Results of Backwashing Efficiency

Figure 5:
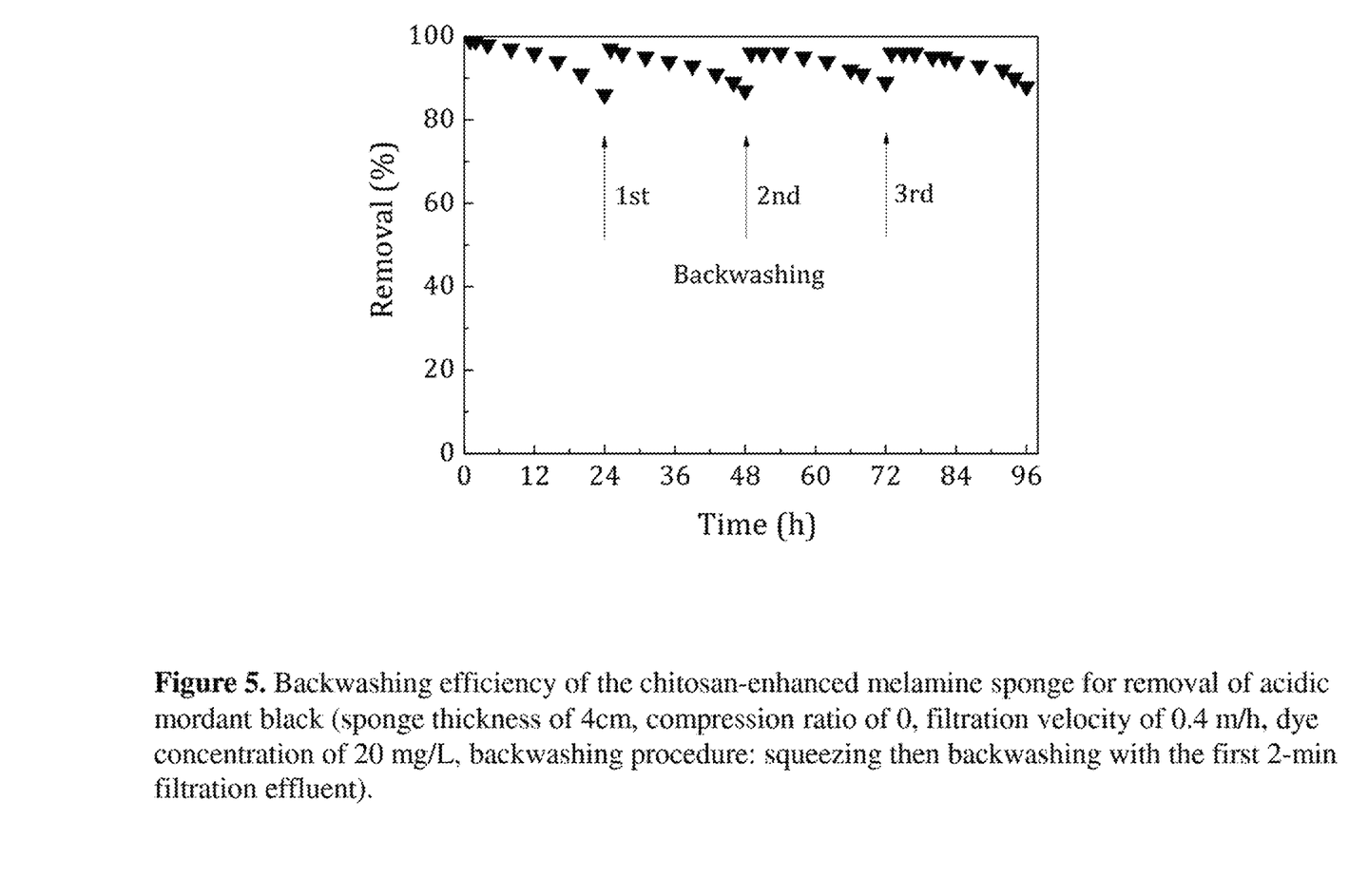
FIG. 5 is a plot showing the backwashing efficiency of the chitosan-enhanced melamine sponge for removal of acidic mordant black (sponge thickness of 4 cm, compression ratio of 0, filtration velocity of 0.4 m/h, dye concentration of 20 mg/L, backwashing procedure: squeezing and then backwashing with the first 2-min filtration effluent).
Figure 6:
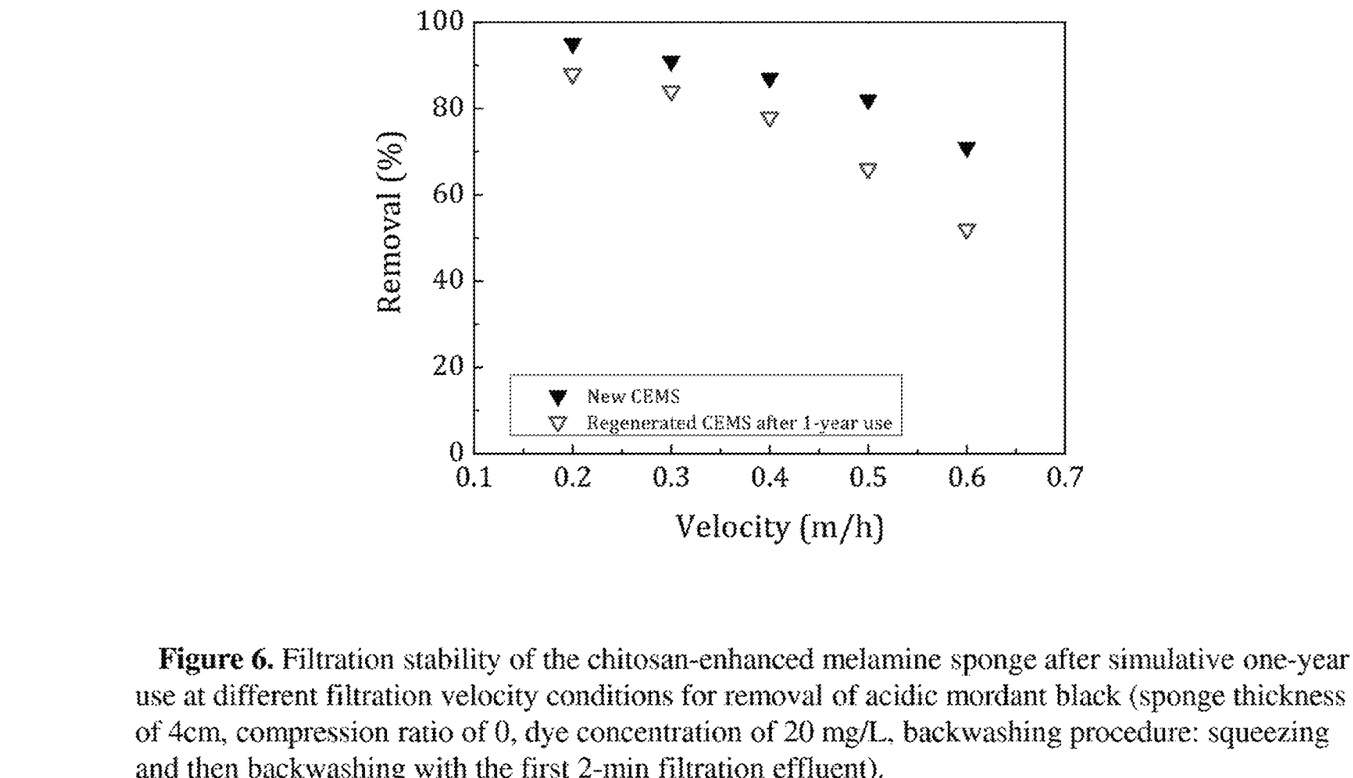
FIG. 6 is a plot showing the filtration stability of the chitosan-enhanced melamine sponge after simulative one-year use at different filtration velocity conditions for removal of acidic mordant black (sponge thickness of 4 cm, compression ratio of 0, dye concentration of 20 mg/L, backwashing procedure: squeezing and then backwashing with the first 2-min filtration effluent).

After the first squeezing/compressing, the CEMS adsorbed the first-2-min filtration effluent, and then was compressed again to desorb for the backwashing of the CEMS. The backwashed CEMS could still efficiently remove the chemicals, showing a stable reuse ability as shown in FIG. 5. Reducing the filtration velocity was beneficial to the removal efficiency and filtration stability. At the 0.2 m/h, 96% of acid mordant black A was removed as shown in FIG. 6. After one-year simulated use, the CEMS still could maintain a high removal efficiency of 88%.

Example 1-F: Experimental Results of Controllable Removal of Chemicals

Figure 7:
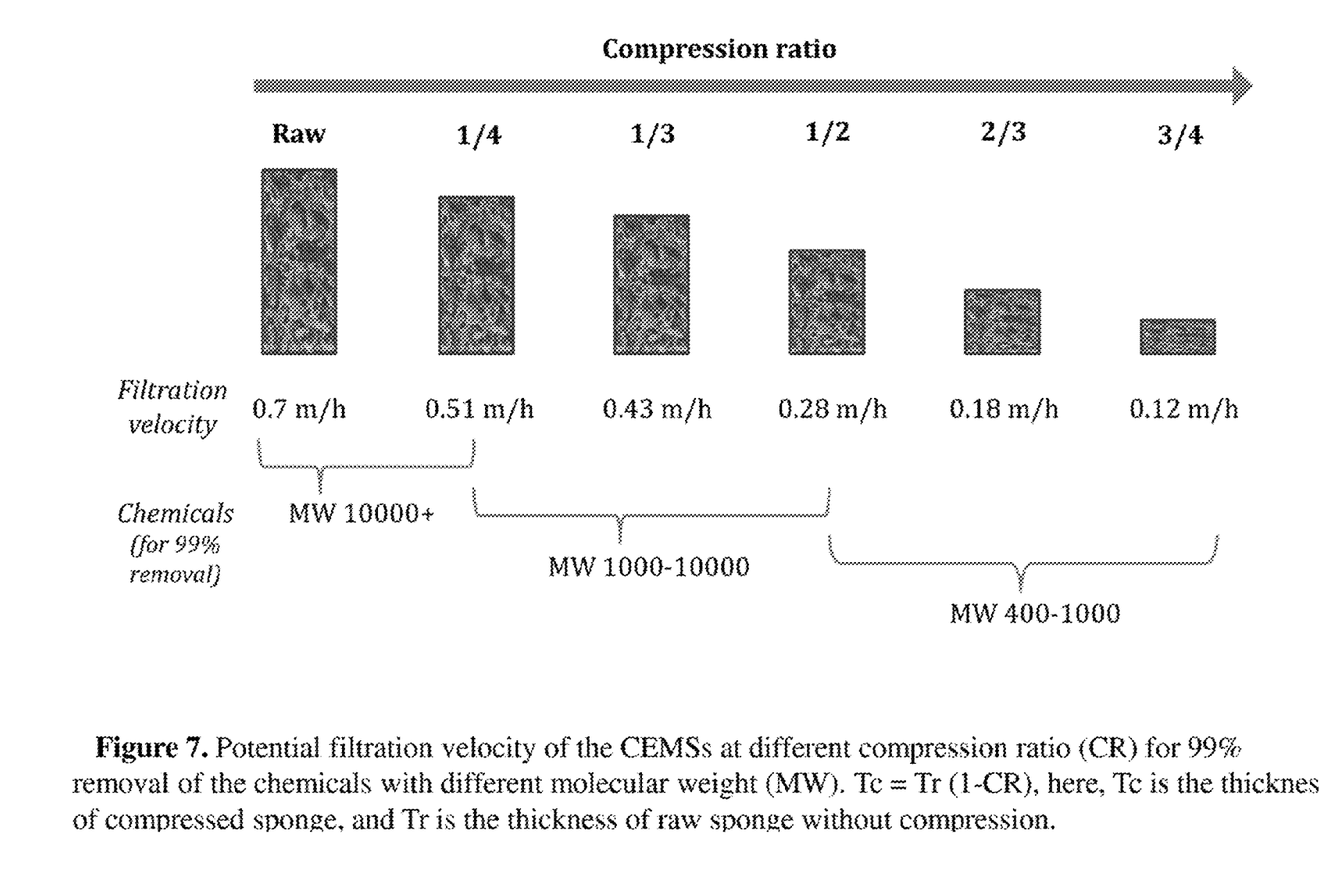
FIG. 7 shows the potential filtration velocity of the CEMSs at different compression ratio (CR) for 99% removal of the chemicals with different molecular weight (MW). Tc=Tr (1-CR), here, Tc is the thickness of compressed sponge, and Tr is the thickness of raw sponge without compression.

Compressing the sponge could also improve the filtration efficiency. At 3/4 of the compression ratio, the CEMS removed 99% of acid mordant black A at an acceptable filtration velocity of 0.12 m/h. The potential filtration capacity of the CEMS at different compression ratio was shown in FIG. 7. The sponge could efficiently capture chemicals and particles with molecular weight (MW) lager than 400, such as bacteria, microplastic, and toxic nanomaterial. Compared to the commercial products in Table 1, the sponge in this invention has better water yield at low energy consumption. As to the real municipal wastewater with 52 mg/L of DOC, the sponge could remove 72% of DOC at the filtration velocity of 0.4 m/h under the condition of gravity flow, showing better removal and lower energy consumption than commercial ultrafiltration membrane. Further, when the sponge is compressed to 1/7 of raw thickness, it can remove 99% DOC of the municipal wastewater at the water velocity of 0.06 m/h. The new sponge product has the potential of replacing the traditional biological treatment, considering its advantages in saving energy, chemicals, and space.

TABLE 1

Filtration efficiency, Water yield, regeneration operation, and energy consumption of the chitosan-enhanced melamine sponge in this invention and other commercial products for dye removal. MF, UF, and NF are microfiltration, ultrafiltration, and nanofiltration, respectively.

| Treatment unit | Dye removal | Velocity | Regeneration situation | Energy consumption and cost |
|---|---|---|---|---|
| Chitosan-enhanced melamine sponge (This invention) | 82% | 0.5 m/h | Easy (Squeezing) | Lowest (Gravity-driven flow & low backwashing frequency) |
| Magnetic ion exchange resin ® | 68% | 0.25 m/h | Easy (Saturated salt solution) | Low (Gravity-driven flow) |
| MF ® | 36% | 0.5 m/h | Normal | Normal |
| UF ® | 57% | 0.3 m/h | Hard | High |
| NF ® | 93% | 0.1 m/h | Hardest (Physical & chemical cleaning) | Highest |

Example 2-A: Fabrication of Sticky Chitosan-Enhanced Melamine Sponge

A commercial melamine sponge with pore size of 200 μm was soaked in a mixed solution of acrylic acid and chitosan at 50° C. In here, the volume of mixed solution was three times of the dry sponge volume, and the adding mass ratio of the acrylic acid and the mass ratio of chitosan to the raw dry melamine sponge were 6.2 and 2.5, respectively. Then, the sponge was compressed for 12 times (with the compression frequency of 18 times per hour) in the mixed solution to make the sponge saturated. In the compressing process, the compression ratio of sponge for the saturation adsorbing the oxalic acid was controlled at 50%. After the 10-min ultrasonic degas, the saturated sponge with the mixture of acrylic acid and chitosan was dried under 120° C. for 26 hours. Finally, this dried sponge was soaked and saturated in a solution of 3.4% (m/m) terephthalaldehyde at 97° C. for three hours with 40 times compression. In this process, the compression ratio of sponge for the saturation was controlled at 30%. After washing by water, the above sticky chitosan-enhanced melamine sponge (SCEMS) could be applied for filtration.

Example 2-B: Experimental Results of Selective Separation of Organics and Inorganics Experiments were performed to demonstrate the selective separation of organics and inorganics by the sticky chitosan-enhanced melamine sponge. As seen in Table 2, the SCEMS could efficiently remove the organics, including the organics with a low molecular weight (MW). The raw SCEMS without compressing had a height of 4 cm, and it was compressed to 20% of raw height for the following filtration investigation. About 90% of the organics were removed with a permeance of 0.04 m/h for 12-hour running. Meanwhile, the SCEMS permitted inorganic ions, including $Na^+$, $Li^+$, $Ag^+$, $Au^+$, $Cu^{2+}$, $Pb^{2+}$, $Zn^{2+}$, $Al^{3+}$, and $Fe^{3+}$ to pass through the sponge. Hence, the SCEMS can be used for selective separation of organic and inorganic materials.

TABLE 2

Performance of a SCEMS as filter

| Organics | MW | Concentration | Permeance (m/h) | Removal efficiency after 1-day running (%) |
|---|---|---|---|---|
| 17α-ethynylestradiol | 364.5 | 100 ng/L | 0.07 | 99.5 |
| Polychlorinated biphenyl (PCB No 156) | 360.9 | 300 ng/L | 0.05 | 99.1 |
| Methyl orange | 327 | 10 mg/L | 0.05 | 91.6 |
| Bisphenol A | 228 | 600 μg/L | 0.04 | 90.2 |

Example 3: Enhanced SCEMS Filter by Carbon

A SCEMS manufactured as in example 2A was enhanced by the carbon powder with size of 30 μm. We only added the carbon power (its mass ratio to the dry raw sponge is 1/6) into the mixture before soaking the raw sponge. This new enhanced SCEMS filter by carbon was named as CpCEMS. The raw CSCMS filter without compressing had a height of 4 cm, and it was compressed to 20% of raw height for the following filtration investigation. About 99.9% of the organics (shown in Table 3) were removed with a permeance of 0.04 m/h for 12-hour running, showing a better filtration performance than that of the SCEMS.

TABLE 3

Performance of CpCEMS

| Organics | MW | Concentration | Permeance (m/h) | Removal efficiency after 1-day running (%) |
|---|---|---|---|---|
| Methyl orange | 327 | 10 mg/L | 0.05 | 99.9 |
| Bisphenol A | 228 | 600 µg/L | 0.04 | 99.9 |

Example 4: Enhanced SCEMS filter by sulphamic acid

A SCEMS manufactured as in example 2A was enhanced by the sulphamic acid. We only added the sulphamic acid (its mass ratio to the dry raw sponge is 3/4) into the mixture before soaking the raw sponge. This new enhanced SCEMS filter by sulphamic acid was named as ACEMS. The raw ACMS filter without compressing had a height of 4 cm, and it was compressed to 8% of raw height for the following filtration investigation. About 82.9% of the heavy metal cations (shown in Table 4) were removed with a permeance of 0.02 m/h for 24-hour running.

TABLE 4

Performance of ACEMS

| Organics | Concentration | Permeance (m/h) | Removal efficiency after 1-day running (%) |
|---|---|---|---|
| $Pb^{2+}$ | 1 mg/L | 0.02 | 91.6 |
| $Zn^{2+}$ | 1 mg/L | 0.02 | 82.9 |

Example 5: A New Filtration Technique of Cascading Over Sponge

Embodiments of the subject invention provide a new filtration technique of cascading over sponge. The key mechanism is to enhance the contact between pollutants and the filter. In this method, sponge with good hygroscopicity and efficient surface is essential.

Figure 8:
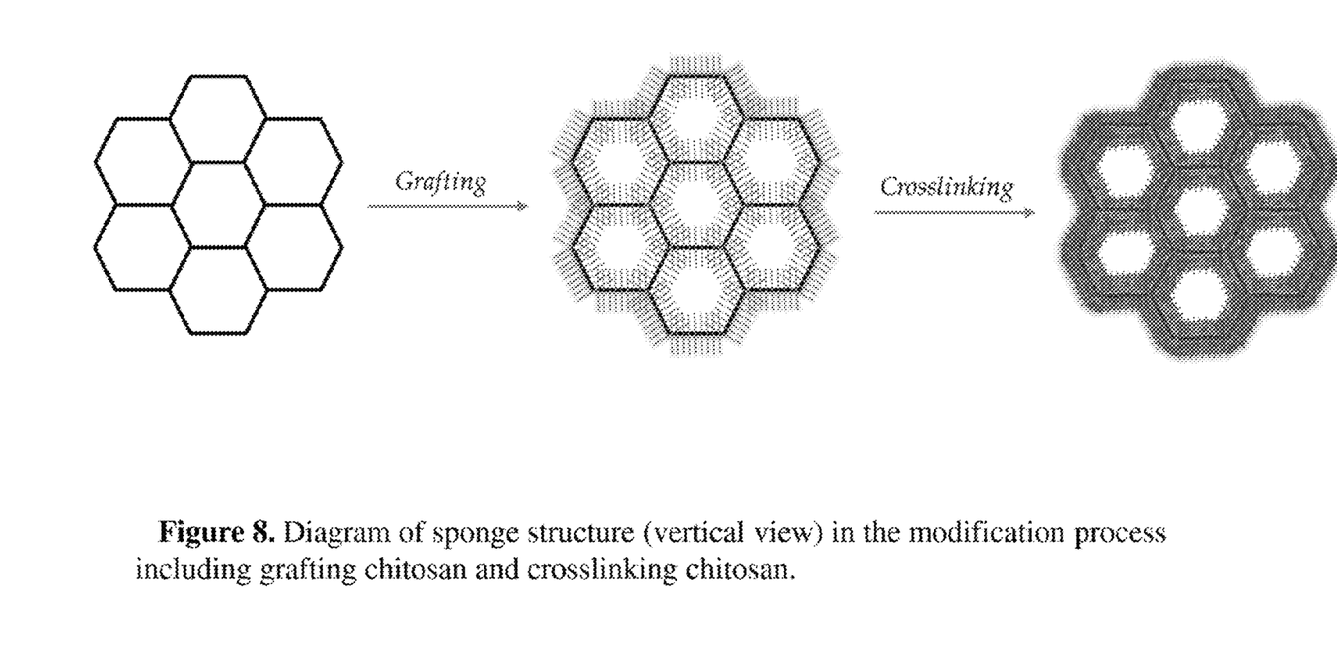
FIG. 8 illustrates the change of the melamine sponge structure (vertical view) after grafting and crosslinking chitosan in the modification process.
Figure 9:
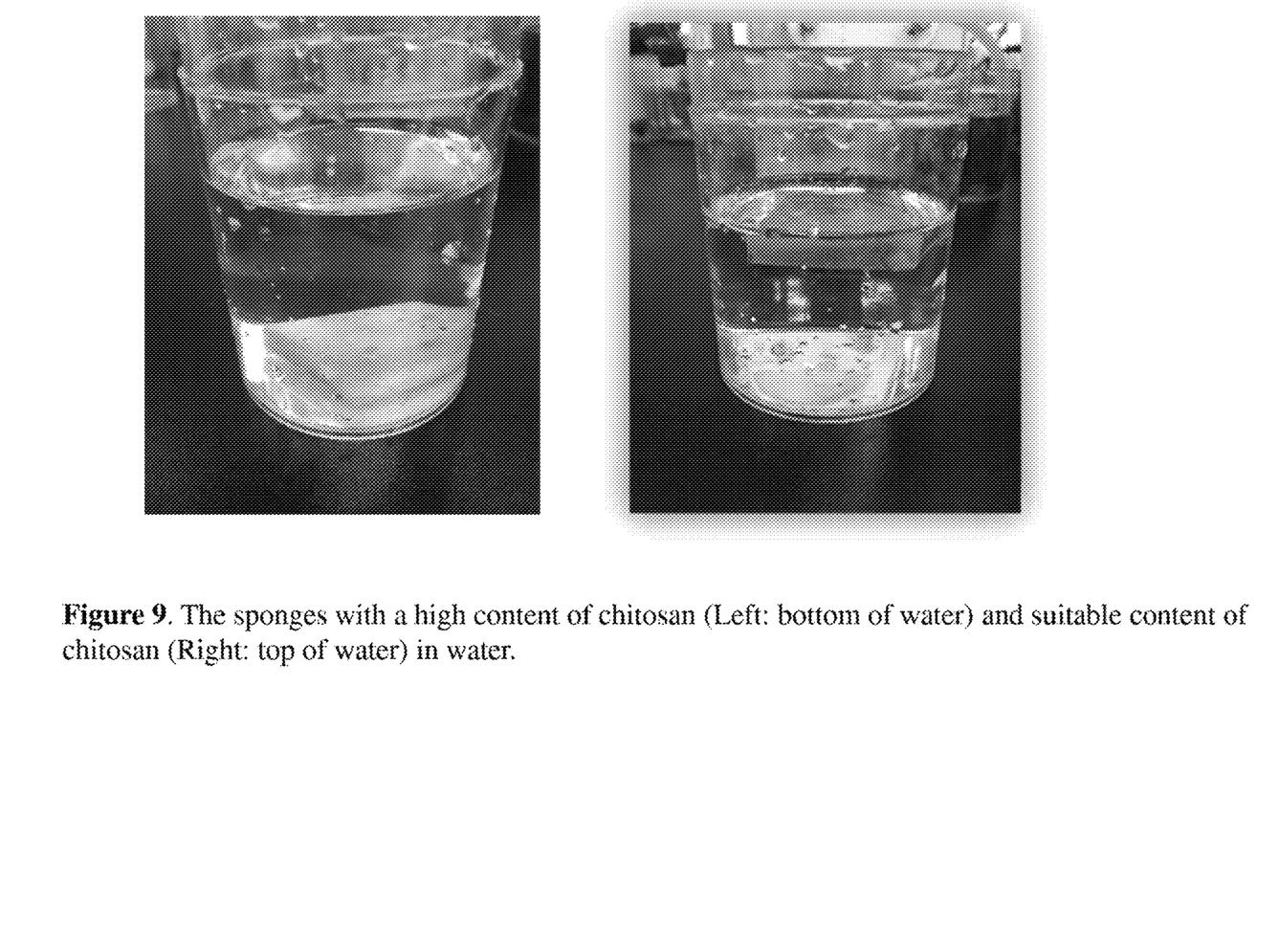
FIG. 9 shows photos of the sponges with a high content of chitosan (Left: bottom of water) and suitable content of chitosan (Right: top of water) in water.

The modification process of melamine sponge to enlarge the surface without obvious harm on hygroscopicity in this invention includes two integrant reactions of grafting and crosslinking as shown in FIG. 8. For the grafting, first, the acid with two carboxyl groups, such as oxalic acid, is used to soak a dry melamine sponge and interact with the sponge. After drying, the sponge with the acid (named acidic sponge here) is immersed in a chitosan solution under a heating condition to graft the chitosan on the matrix of the sponge (seen in the middle diagram of FIG. 9). Then, after drying, the sponge with chitosan is ready for further crosslinking. For the crosslinking, the above sponge with chitosan can be immersed in a crosslinker (for example, glutaraldehyde) solution under heating. After aging, the robust sponge with a larger surface and smaller pores is washed by the ethyl alcohol and water for application as a filter.

Figure 10:
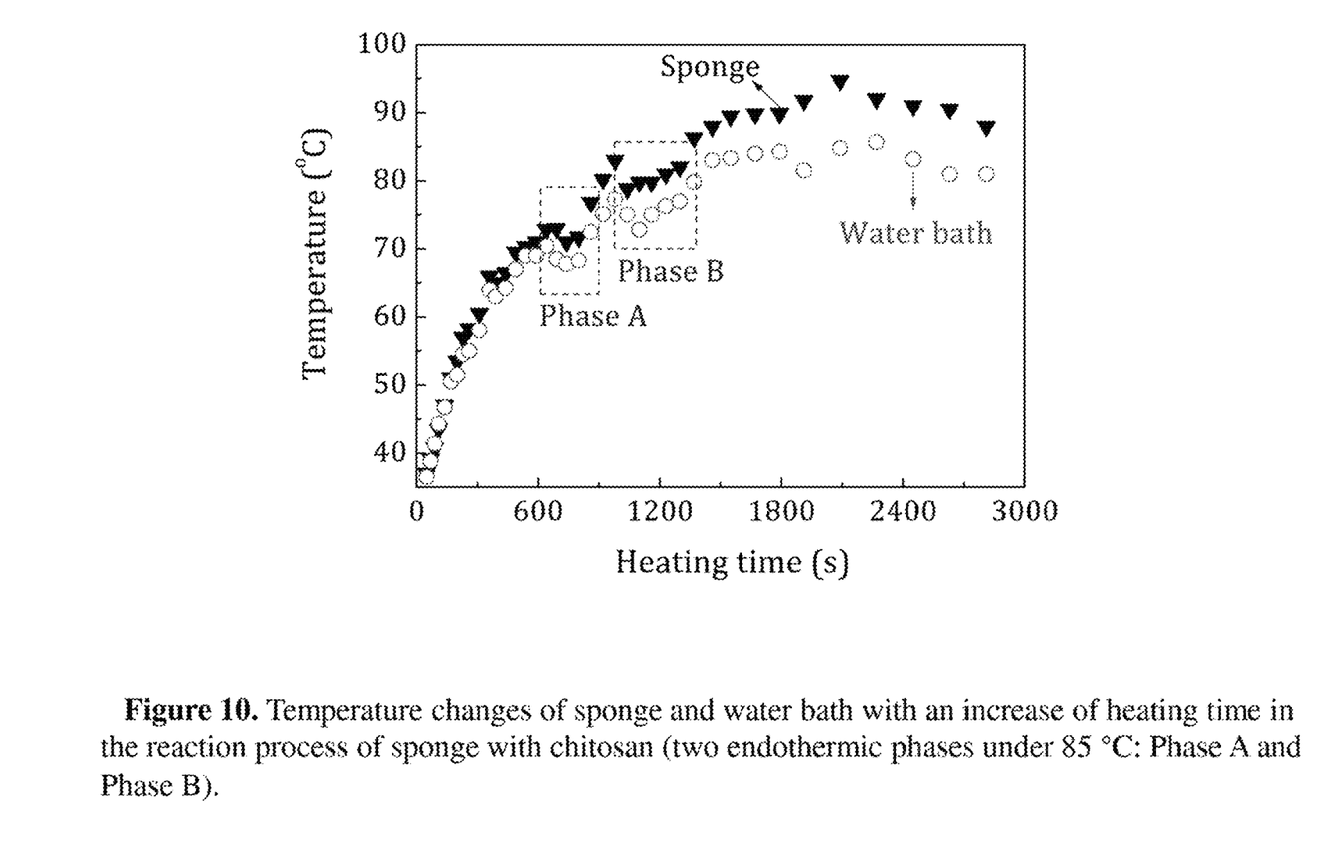
FIG. 10 is a plot showing the temperature change of sponge and water bath with an increase of heating time in the reaction process of sponge with chitosan (two endothermic phases under 85° C.: Phase A and Phase B).

During the modification process, the concentration of the acid, chitosan concentration, and glutaraldehyde concentration are important factors for the sponge. As shown in the left photo of FIG. 9, the sponge sinks to the bottom when the concentration of the three chemicals is high, resulting in a too dense sponge with low hygroscopicity. Thus, we should adjust the content of the chemicals to maintain the suitable pore size and surface area for filtration use (like in the Right of the FIG. 9). Meanwhile, the temperature should be controlled over 85° C. to make sure the reactions happen, as shown in FIG. 10 presenting two endothermic phases under 85° C.

Figure 11:
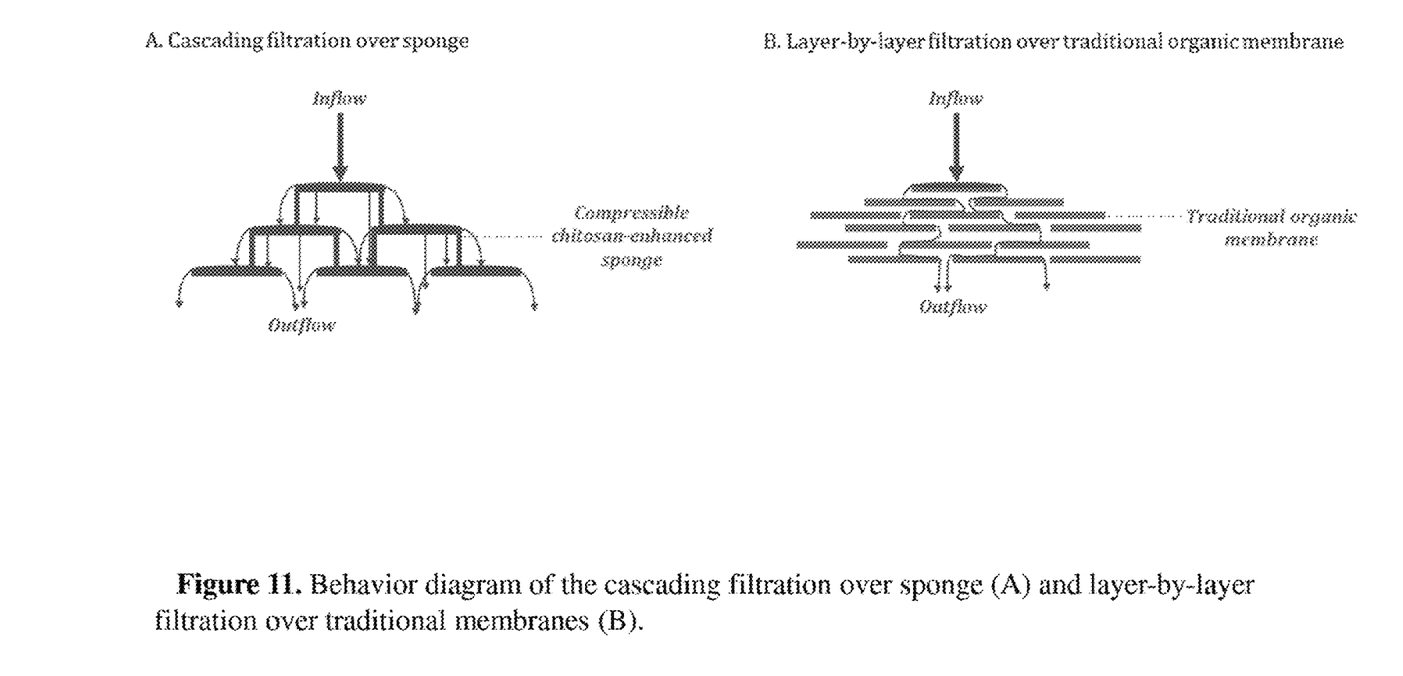
FIG. 11 illustrates the behavior difference of the cascading filtration over sponge (A, vertical view) and layer-by-layer filtration over traditional membranes (B, vertical view).

In the filtration process (FIG. 11A), while the inflow driven by gravity passes through, the hygroscopic surface of the chitosan-enhanced melamine sponge can imbibe water and chemicals, and then capture the chemicals efficiently by some interactions, such as H-bonding and diffusion. However, for the layer-by-layer filtration of using traditional organic or graphene-based membranes (FIG. 11B), the water flow generally passes through quickly via the pores or channels without a sufficient contact opportunity under the quite higher filtration pressure which is used to help water pass through the nanopores. In summary, the new filtration technique of cascading over sponge shows a higher rejection and a larger permeance under a lower energy input.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. A method of making a chitosan-enhanced melamine sponge, comprising:
    grafting chitosan on a melamine sponge matrix using an acidic chemical with two or more carboxyl groups; and
    crosslinking the chitosan with a crosslinker under heat to make the chitosan-enhanced melamine sponge having a larger surface and smaller pores than the melamine sponge matrix.

2. The method of claim 1, wherein the acidic chemical with two or more carboxyl groups comprises oxalic acid, acrylic acid, hexanedioic acid, phthalic acid, butenedioic acid, citric acid or pyromellitic acid.

3. The method of claim 1, wherein the crosslinker comprises glutaraldehyde, terephthalaldehyde, sodium tripolyphosphate, sodium hexametaphosphate, or carrageenan.

4. The method of claim 1, wherein the mass ratio of chitosan to the melamine sponge is from 0.8 to 2.5.

5. The method of claim 1, wherein a mass ratio of the acidic chemical with two or more carboxyl groups to the melamine sponge is from 2 to 8.

6. The method of claim 1, wherein a mass ratio of crosslinker to the melamine sponge matrix is from 0.9 to 3.6.

7. The method of claim 1, wherein a temperature of the grafting is from 38° C. to 65° C.

8. The method of claim 1, wherein a temperature of the crosslinking is over 85° C. and under 200° C.

9. The method of claim 1, wherein a compression frequency of the melamine sponge matrix in grafting is less than 6 times per minute, and the compression ratio is less than 80%.

10. The method of claim 1, wherein a compression frequency of the melamine sponge matrix in crosslinking is less than 2 times per minute, and a compression ratio is less than 50%.

11. The method of claim 1, wherein the chitosan-enhanced melamine sponge is compressed or squeezed by a device to form a compressible filter.

12. The method of claim 11, wherein a filter comprising the chitosan-enhanced melamine sponge is driven by the gravity flow for filtration to reduce the energy input.

13. The method of claim 11, wherein a compression ratio of the chitosan-enhanced melamine sponge is adjusted from 0 to 6/7 to reject different size of chemicals under different filtration velocity.

14. The method of claim 11, wherein a compression velocity of the chitosan-enhanced melamine sponge is controlled from 1 m/h to 3600 m/h by adjusting the compression ratio to form a large water shear to desorb chemicals from the chitosan-enhanced melamine sponge.

15. The method of claim 14, wherein a compression ratio of the chitosan-enhanced melamine sponge is less than 9/10.

16. The method of claim 14, wherein desorption is enhanced via regenerants.

17. A method of separating chemicals from a fluid stream, comprising:
providing a filter comprising the chitosan-enhanced melamine sponge made according to claim 1; and
driving the fluid stream to pass through the filter for filtration by gravity to reduce the energy input.

18. The method of claim 17, further comprising:
adjusting the compression ratio of the chitosan-enhanced melamine sponge to separate different chemicals from the fluid stream; and
squeezing and then backwashing the chitosan-enhanced melamine sponge in order to preserve its serviceable lifespan.

* * * * *